US008622823B2

(12) United States Patent
Huynh et al.

(10) Patent No.: US 8,622,823 B2
(45) Date of Patent: Jan. 7, 2014

(54) COMMUNICATING IN-CASINO EMERGENCY NOTIFICATIONS

(75) Inventors: Lee Huynh, Rolling Meadows, IL (US); Jason R. Lewis, III, Chicago, IL (US)

(73) Assignee: WMS Gaming, Inc., Waukegan, IL (US)

( * ) Notice: Subject to any disclaimer, the term of this patent is extended or adjusted under 35 U.S.C. 154(b) by 225 days.

(21) Appl. No.: 13/127,537

(22) PCT Filed: Nov. 12, 2009

(86) PCT No.: PCT/US2009/064245
§ 371 (c)(1),
(2), (4) Date: May 4, 2011

(87) PCT Pub. No.: WO2010/056891
PCT Pub. Date: May 20, 2010

(65) Prior Publication Data

US 2011/0205068 A1 Aug. 25, 2011

Related U.S. Application Data

(60) Provisional application No. 61/114,258, filed on Nov. 13, 2008.

(51) Int. Cl.
*A63F 13/00* (2006.01)

(52) U.S. Cl.
USPC .................. 463/29; 463/40; 463/25; 463/30; 600/300

(58) Field of Classification Search
None
See application file for complete search history.

(56) References Cited

U.S. PATENT DOCUMENTS

| | | | | |
|---|---|---|---|---|
| 7,356,345 | B2 * | 4/2008 | Cunningham et al. | 455/466 |
| 2005/0010087 | A1 | 1/2005 | Banet et al. | |
| 2005/0239545 | A1 * | 10/2005 | Rowe | 463/29 |
| 2005/0255919 | A1 * | 11/2005 | Nelson | 463/40 |
| 2006/0019747 | A1 * | 1/2006 | Loose et al. | 463/30 |
| 2006/0166741 | A1 * | 7/2006 | Boyd et al. | 463/42 |
| 2006/0293100 | A1 * | 12/2006 | Walter | 463/30 |
| 2007/0299321 | A1 | 12/2007 | Brown | |
| 2008/0039196 | A1 * | 2/2008 | Walther et al. | 463/27 |
| 2008/0113708 | A1 * | 5/2008 | Beadell et al. | 463/16 |
| 2008/0113715 | A1 | 5/2008 | Beadell et al. | |
| 2008/0146301 | A1 | 6/2008 | Goggin et al. | |

(Continued)

FOREIGN PATENT DOCUMENTS

| | | |
|---|---|---|
| JP | 200886426 | 4/2008 |
| WO | WO2010056891 | 5/2010 |

OTHER PUBLICATIONS

"PCT Application No. PCT/US09/64245 Corrected International Preliminary Report on Patentability", Apr. 18, 2011 , 10 pages.

(Continued)

*Primary Examiner* — Paul A D'Agostino
(74) *Attorney, Agent, or Firm* — DeLizio Gilliam, PLLC

(57) ABSTRACT

A wagering game system and its operations are described herein. In embodiments, the operations can include determining emergency information that indicates a potential threat to the well being of one or more individuals (e.g., patrons, staff, etc.) within a casino. The operations can also include determining and presenting emergency content, on wagering game machines within the casino, which notifies the one or more individuals of the threat. The operations can also include determining individual specific emergency information that relates specifically to the one or more individuals, and providing the individual specific emergency information to the one or more individuals.

24 Claims, 9 Drawing Sheets

(56) References Cited

U.S. PATENT DOCUMENTS

| | | | | |
|---|---|---|---|---|
| 2008/0146892 | A1 | 6/2008 | LeBoeuf et al. | |
| 2008/0154099 | A1 | 6/2008 | Aspel et al. | |
| 2010/0113161 | A1 * | 5/2010 | Walker et al. | 463/42 |
| 2010/0279755 | A1 * | 11/2010 | Pacey et al. | 463/6 |
| 2011/0045910 | A1 * | 2/2011 | McKenna et al. | 463/42 |

OTHER PUBLICATIONS

"PCT Application No. PCT/US09/64245 International Preliminary Report on Patentability", Mar. 15, 2011 , 10 pages.

"PCT Application No. PCT/US09/64245 International Search Report", Dec. 23, 2009 , 10 pages.

* cited by examiner

COMMUNICATING IN-CASINO EMERGENCY NOTIFICATIONS

RELATED APPLICATIONS

This application claims the priority benefit of U.S. Provisional Application Ser. No. 61/114,258 filed Nov. 13, 2008.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2009, WMS Gaming, Inc.

TECHNICAL FIELD

Embodiments of the inventive subject matter relate generally to wagering game systems and networks that, more particularly, communicate in-casino emergency notifications.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

SUMMARY

In some embodiments, a method comprises determining emergency information that indicates a threat to the well being of one or more individuals within a casino; determining emergency content to present to the one or more individuals to notify the one or more individuals of the threat; presenting the emergency content on one or more wagering game machines within the casino; determining individual specific emergency information that relates specifically to the one or more individuals; and providing the individual specific emergency information to the one or more individuals.

In some embodiments, the method further comprises determining a degree of importance for the emergency information; and determining instructions to present the emergency content during a wagering game session with a degree of intrusiveness that correlates to the degree of importance for the emergency information.

In some embodiments, determining the emergency information that indicates a threat to the well being of the one or more individuals within the casino comprises determining a biometric reading of the one or more individuals within the casino; and determining a disturbance in the biometric reading that indicates bodily distress.

In some embodiments, determining a biometric reading comprises monitoring the one or more individuals for one or more of physical symptoms of illness, indications of bodily injury, audible sounds of distress, dramatic change in pulse, dramatic change in blood pressure, change in body temperature, pained facial expressions, erratic body movements, belabored breathing, fainting, and vocal sounds of alarm.

In some embodiments, presenting the emergency content on the one or more wagering game machines comprises displaying a map on the one or more wagering game machines showing an exit path in relation to representations of one or more casino boundaries.

In some embodiments, one or more machine-readable media having instructions stored thereon, which when executed by a set of one or more processors causes the set of one or more processors to perform operations comprises determining one or more indications of distress of one or more distressed individuals in a casino; determining identifying information for one or more distressed individuals that exhibit the one or more indications of distress; determining emergency care instructions for the one or more distressed individuals; determining a location of one or more nearby persons in the casino capable of assisting the one or more distressed individuals; and presenting notifications on casino devices that are close to the one or more nearby persons to notify the one or more nearby persons of the one or more distressed individuals.

In some embodiments, the notifications include one or more of the identifying information for the one or more distressed individuals, the one or more indications of distress, and the emergency care instructions.

In some embodiments, the machine-readable media said operations further comprises determining emergency care qualifications for the one or more nearby persons, wherein the emergency care qualifications indicate that the one or more nearby persons are capable of assisting the one or more distressed individuals; and notifying the one or more nearby persons based on their emergency care qualifications.

In some embodiments, said operation of presenting notifications on the casino devices that are close to the one or more nearby persons further comprises presenting a map on a wagering game machine display showing a location of the one or more distressed individuals in relation to the location of the one or more nearby persons.

In some embodiments, said operation of determining a location of the one or more nearby persons capable of assisting the one or more distressed individuals further comprises determining the location of one or more individuals associated with the one or more distressed individuals.

In some embodiments, said operation of determining the one or more indications of distress of the one or more distressed individuals comprises determining one or more of erratic body movements, unnatural biometrics, unusual facial expressions, group agitation, group stillness, sounds of alarm or distress, and behaviors of the individual that indicate bodily distress.

In some embodiments, the machine-readable media said operations further comprises determining input from the one or more distressed individuals regarding the one or more indications of distress; and determining the emergency care instructions for the one or more distressed individuals based on the input.

In some embodiments, a system, comprises an emergency coordination server including, an emergency monitoring unit configured to determine emergency information that indicates an emergency situation affecting one or more individuals within a casino, an identification unit configured to determine personal information about the one or more individuals within the casino, and a monitoring processor configured to determine emergency instructions to present to the one or more individuals to notify the one or more individuals of the emergency situation, wherein the emergency instructions relate to the emergency information and the personal information; and a wagering game machine comprises; an emergency content controller configured to present the emergency instructions on one or more devices associated with the one or more individuals.

In some embodiments, the wagering game machine further comprises a location tracking unit configured to determine a location of the one or more individuals within the casino, and present a map indicating the location of the one or more individuals and the emergency instructions.

In some embodiments, the emergency coordination server further comprises, a mapping module configured to generate the map indicating the location of the one or more individuals, and provide the map to the wagering game machine.

In some embodiments, the wagering game machine further comprises a biometric device controller configured to determine biometric data indicating distress experienced by the one or more individuals during the emergency situation, and provide the biometric data to the monitoring processor to determine the emergency instructions.

In some embodiments, the wagering game machine further comprises a communication unit configured to provide two-way communications between the one or more individuals within the casino.

In some embodiments, the emergency monitoring unit is configured to determine information from one or more of a fire system, an alarm system, physical facility monitoring equipment, an emergency services system, a security enforcement system, emergency response system, a custodial services system, an engineering services system, a weather services system, a terrorist warning services system, a law enforcement services system, and an amber alert services system.

In some embodiments, an apparatus, comprises a monitoring unit configured to determine an emergency notification for a casino, determine an identity of a casino patron using a mobile wagering game machine, present a map on a display of the mobile wagering game machine, wherein the map displays representations of one or more casino boundaries, present a location of the casino patron on a map in relation to the one or more representations of the one or more casino boundaries on the map, present the location of one or more additional patrons on the map in relation to one or more of the location of the one or more representations of the one or more casino boundaries and the location of the casino patron, and present an emergency meeting location for the casino patron and the one or more additional patrons.

In some embodiments, the monitoring unit is further configured to determine movement of one or more tracking devices associated with one or more of the mobile wagering game machine, the casino patron, and the one or more additional patrons, and present the movement on the map.

In some embodiments, the monitoring unit is further configured to present an escape route on the map for the one or more individuals based on one or more of individual identity, individual preferences, assigned meeting places for a group, individual medical history, account information, and individual biometric data.

In some embodiments, the monitoring unit is configured to determine the emergency meeting location for the associated individuals by determining one or more of overall patron population in the casino, distribution of associated group members, physical abilities of patrons, age of patrons, relationships between patrons, and detected health issues of patrons.

In some embodiments, an apparatus, comprises means for determining emergency information that indicates one or more of a potential harm and a safety hazard to one or more individuals on a casino floor; means for determining a degree of severity for the emergency information; means for determining, based on the degree of severity, emergency content to present to the one or more individuals during a wagering game session; means for determining a degree of presentation intrusiveness that correlates to the degree of severity for the emergency information; and means for presenting the emergency content, according to the degree of presentation intrusiveness, on a wagering game machine that hosts the wagering game session.

In some embodiments, the means for determining a degree of presentation intrusiveness comprises means for determining that the degree of presentation intrusiveness correlates to one or more of an amount of a wagering game display to occupy with the emergency content, a degree of repetitiveness for presenting the emergency content, and level of audio volume for presenting the emergency content, and a degree of visual effect for presenting the emergency content.

In some embodiments, the means for determining the emergency information comprises means for determining biometric data of the one or more individuals that indicate possible signs of bodily distress experienced by the one or more individuals.

BRIEF DESCRIPTION OF THE DRAWING(S)

Embodiments are illustrated in the Figures of the accompanying drawings in which.

DESCRIPTION OF ILLUSTRATIVE EMBODIMENTS

This description of the embodiments is divided into five sections. The first section provides an introduction to embodiments. The second section describes example operating environments while the third section describes example operations performed by some embodiments. The fourth section describes additional example operating environments while the fifth section presents some general comments.

Introduction

This section provides an introduction to some embodiments.

Casino operators have to be concerned with public health and safety. Large groups of people visit casinos on a regular basis, in all seasons. Sometimes emergencies, hazards, physical health related dangers, and important activities related to such dangers may arise during the course of business when casino patrons, staff, and other individuals are within the casino. Further, some casinos may, by regulation or choice, make the casino floor (i.e., the location where gambling and gaming devices are offered for use) secluded. Also, casino floors tend to have a lot of rows and walkways which may disorient a casino patron. Therefore, especially within the confines of a casino floor, the emergencies and hazards that may affect patrons become especially dangerous. Casinos are faced with the challenge of disseminating emergency notifications to casino patrons in a comprehensive and efficient manner. Embodiments of the inventive subject matter, however, present solutions to many of those challenges including determining and communicating in-casino emergency notifications via wagering game machines, determining and presenting specific information that can be useful to a patron during emergencies, determining casino patrons that may be in distress and assisting them, determining group biometrics that indicate emergencies and notifying emergency services of the potential emergencies, determining casino patron identities, preferences and history to assist in aiding the patron during emergencies, providing patron specific communication abilities during emergencies, and so forth.

Figure 1:
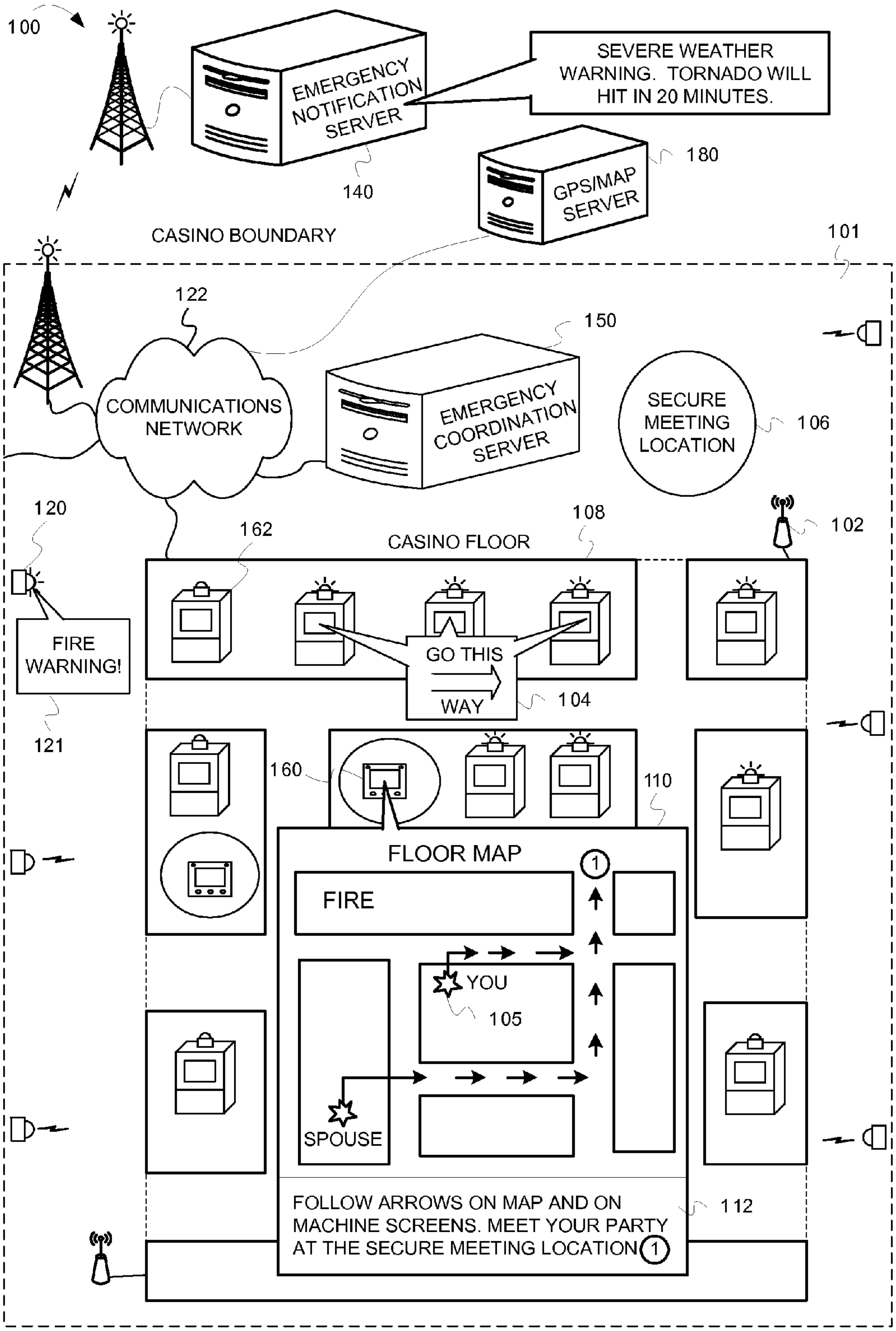
FIG. 1 is an illustration of determining and communicating in-casino emergency notifications, according to some embodiments.

FIG. 1 is a conceptual diagram that illustrates an example of determining and communicating in-casino emergency notifications, according to some embodiments. In FIG. 1, a wagering game system ("system") 100, can include various devices that can notify casino patrons, and other individuals, within the boundary of a casino 101, and, especially, within a casino floor 108. The system 100 can include an emergency coordination server 150 connected to a communications network 122. The communications network 122 can be connected to a communications infrastructure for the casino 101 and the casino floor 108 such that any device within the casino 101 is networked, and can inter-communicate via the communications network 122. Some devices include wireless transceivers 102, casino emergency monitoring devices 120 (e.g., fire sensors and alarms, security sensors and alarms, etc.), and wagering game machines (e.g., mobile wagering game machines 160, standing model wagering game machines 162, etc.). The system 100 can utilize the emergency coordination server 150 to determine (e.g., receive, generate, etc.) emergency notifications and communicate them via the wagering game machines 160 and 162. Though not shown, the wagering game machines 160 and 162 can be connected to various hardware devices (e.g., kiosks, docking stations, monitors, alarms, etc.) that can also be utilized to present emergency notifications. For example, the system 100 can receive notifications of emergencies, such as a fire alarm warning from one of the casino emergency monitoring devices 120, a severe weather warning from an external emergency notification server 140, or some other source, that can affect the health and safety of the patrons on the casino floor 108. Consequently, the system 100 can determine a safe exit route for patrons to take and present notifications on the wagering game machines (e.g., an arrow graphic and directions 104 on wagering game machine displays, a candle signal atop wagering game machines, high quality verbal instructions from the wagering game machine's speakers, etc) that guide the patrons, and others on the casino floor, to safe and available exits.

In some embodiments the wagering game machines 160, 162 are equipped with monitoring devices, such biometric devices, which can monitor the physical state of casino patrons, staff, and other individuals. The wagering game machines 160, 162 can capture the biometric data and provide it to the emergency coordination server 150 to generate and disseminate emergency notifications on the wagering game machines 160, 162. The wagering game machines 160, 162 can also be equipped with patron identification devices, which can detect identifying information about patrons and access the patron's wagering game account, or other accounts, to determine patron specific information (e.g., the patron's group members, emergency contact information, health history, communication preferences, etc.). The system 100 can utilize the patron specific information to notify the patron during an emergency and/or to notify others that may be able to assist the patron during an emergency. In one example, the system 100 generates and presents a floor map 110 on one or more of the mobile wagering game machines 160. However, each mobile wagering game machine 160 can showing graphics that are specific to the location of the patron using the wagering game machine and the locations of other individuals associated with the patron. For example, the floor map 110 on the mobile wagering game machines 160 can show the location of the patron within the casino floor 108, arrows showing the direction that the patron should move in relation to the casino floor layout, hazards (e.g., fire location), a spouse or other persons that are part of the patron's group, instructions 112 that are specific for the patron (e.g., directions to congregate at a specific meeting location 106), etc. In some embodiments, the system 100 can track the location of the mobile wagering game machines 160 and update the image of the floor map 110 to take into consideration the patrons movements, position, line of sight, speed, etc. The system 100 can also present communication preferences associated with the patron (e.g., choice of language, preference for audio versus graphics, etc.), and communication abilities (e.g., two-way communications with other patrons, staff, emergency crew, etc.). The system 100 can utilize the wireless transceivers, internal location tracking equipment, global positioning services (GPS), mapping services (e.g., via the GPS/mapping server 180), etc. to track the location of the patrons and present the floor map 110.

Although FIG. 1 describes some embodiments, the following sections describe many other features and embodiments.

Example Operating Environments

This section describes example operating environments and networks and presents structural aspects of some embodiments. More specifically, this section includes discussion about wagering game system architectures.

Wagering Game System Architecture

Figure 2:
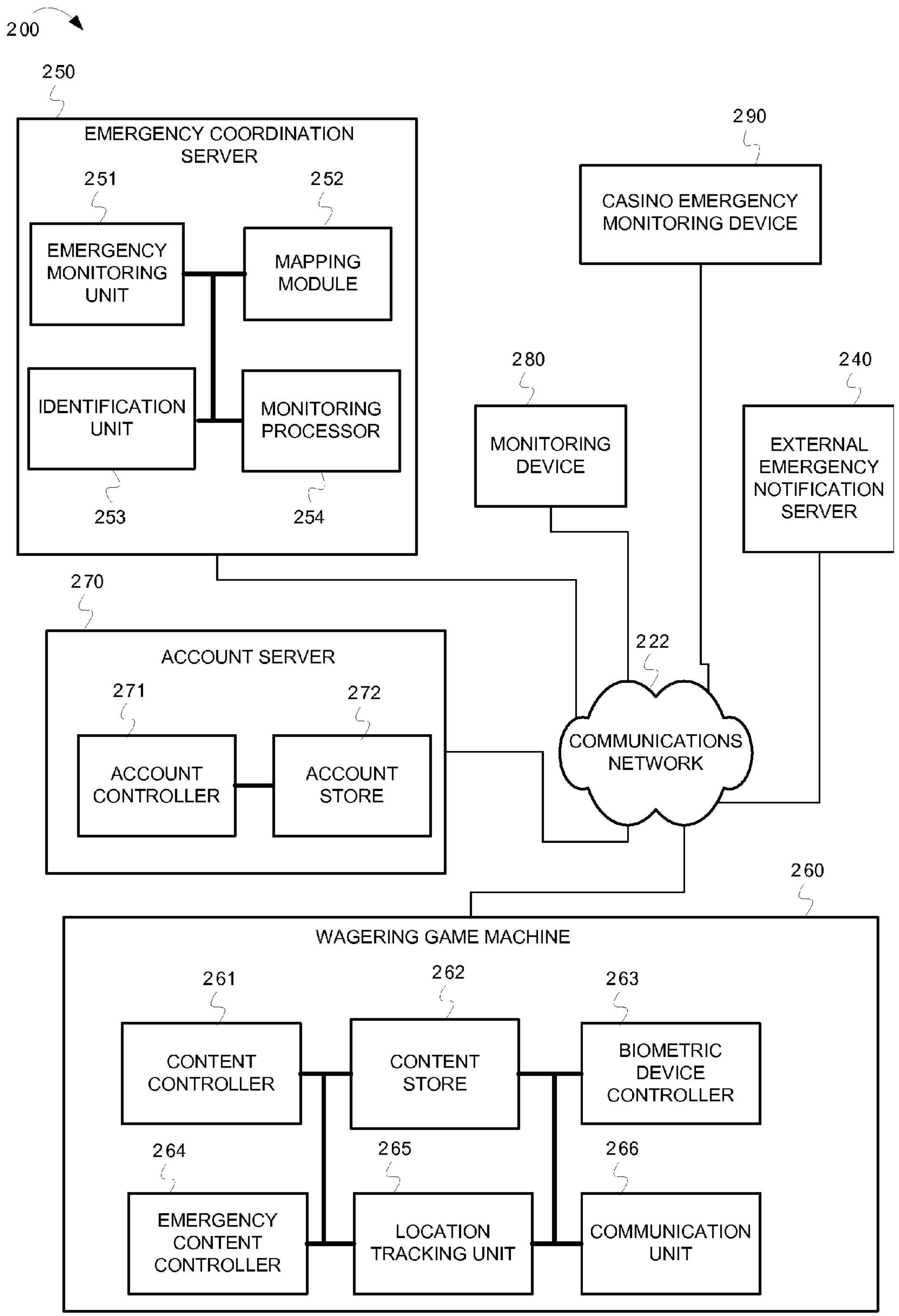
FIG. 2 is an illustration of a wagering game system architecture 200, according to some embodiments.

FIG. 2 is a conceptual diagram that illustrates an example of a wagering game system architecture 200, according to some embodiments. The wagering game system architecture 200 can include an account server 270 configured to control user related accounts accessible via wagering game networks and social networks. The account server 270 can store and track player information, such as identifying information (e.g., avatars, screen name, account identification numbers, etc.) or other information like financial account information, social contact information, etc. The account server 270 can contain accounts for social contacts referenced by the player account. The account server 270 can also provide auditing capabilities, according to regulatory rules, and track the performance of players, machines, and servers. The account server 270 can include an account controller 271 configured to control information for a player's account. The account server 270 can also include an account store 272 configured to store information for a player's account.

The wagering game system architecture 200 can also include an emergency coordination server 250 configured to control and coordinate emergency information between various sources of information and one or more other devices in a casino, such as a wagering game machine 260. The emergency coordination server 250 can include an emergency monitoring unit 251 configured to monitor emergency situations, alarms, notifications, etc. in a casino and also to monitor external situations that may affect the casino. The emergency monitoring unit 251 can receive emergency information from an external emergency notification server 240 and other such servers or services regarding emergencies that may affect the casino. The emergency coordination server 250 can also include a mapping module 252 configured to determine locations and mapping coordinates for the casino. The mapping module 252 can broadcast coordinates so that tracking devices can generate maps of the casino. The mapping module 252 can also use mapping coordinates from external global positioning servers and/or mapping servers to provide coordinates both inside and outside the casino. The emergency coordination server 250 can also include an identification unit 253 configured to determine identities of patrons and other individuals in a casino. The identification unit 253 can communicate with a casino emergency monitoring device 290, a patron monitoring device 280 and the wagering game machine 260 to receive signals, input, or other information about patrons via identification devices (e.g., identification cards, identification bracelets, etc.) possessed by patrons. The identification unit 253 can also communicate with the account server 270 to obtain identification information from accounts (e.g., player accounts, administrative accounts, etc.) on the account server 270. The emergency coordination server 250 can also include a monitoring processor 254 configured to generate and process commands and instructions for the emergency monitoring unit 251, the mapping module 252, and the identification unit 253.

The wagering game system architecture 200 can also include the wagering game machine 260 configured to present wagering games and receive and transmit information to communicate in-casino emergency notifications. The wagering game machine 260 can include a content controller 261 configured to manage and control content and presentation of content on the wagering game machine 260. The wagering game machine 260 can also include a content store 262 configured to contain content to present on the wagering game machine 260. The wagering game machine 260 can also include a biometric device controller 263 configured to control devices (e.g., heart beat monitors, high-resolution video cameras, facial feature scanners, etc.) on the wagering game machine that capture biometric data from patrons that use the wagering game machine and/or patrons and other individuals that are in close proximity to the wagering game machine 260. The wagering game machine 260 can also include an emergency content controller 264 configured to control the presentation of emergency notification content. In some embodiments, the emergency content controller 264 can determine emergency information based on input that the wagering game machine 260 receives. In some embodiments, the emergency content controller 264 can also receive emergency content information from the external emergency coordination server 240, the casino emergency monitoring device 290, the patron monitoring device 280, etc. and present the emergency content. The wagering game machine 260 can also include a location tracking unit 265 configured to determine the location of patrons, group members, and other individuals within the casino boundaries and/or within wireless range of casino tracking devices. The location tracking unit 265 can present maps on the wagering game machine 260 and provide locations of individuals on the maps. The location tracking unit 265 can also provide meeting locations for group members, locations of lost individuals, etc. The wagering game machine 260 can also include a communication unit 266 configured to provide communications (e.g., two-way radio, text messaging, etc.) between patrons, patron groups, casino staff, or other individuals within the casino.

The wagering game system architecture 200 can also include the casino emergency monitoring device 290, the monitoring device 280, and the external emergency notification server 240. The casino emergency monitoring device 290 can determine emergency activity within a casino, such as fires, security breaches, weather hazards, contaminates, structural damage, earthquake effects, etc. The monitoring device 280 can determine activities, characteristics and other information generated by, or experienced by, patrons, and others, which may be related to emergency situations, illness symptoms, and the like. For example, the monitoring device 280 can determine erratic body movements, unnatural biometrics, unusual facial expressions, group agitation or stillness, sounds of alarm or distress, a dramatic change in pulse, a dramatic change in blood pressure, a change in body temperature, a pained facial expression, an erratic body movement, belabored breathing, fainting, vocal sounds of alarm or distress, etc.

Each component shown in the wagering game system architecture 200 is shown as a separate and distinct element connected via a communications network 222. However, some functions performed by one component could be performed by other components. For example, the emergency coordination server 250 can also be configured to perform functions of the emergency content controller 264, the monitoring unit 265, and other network elements and/or system devices. Furthermore, the components shown may all be contained in one device, but some, or all, may be included in, or performed by multiple devices, as in the configurations shown in FIG. 2 or other configurations not shown. Furthermore, the wagering game system architecture 200 can be implemented as software, hardware, any combination thereof, or other forms of embodiments not listed. For example, any of the network components (e.g., the wagering game machines, servers, etc.) can include hardware and machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Example Operations

This section describes operations associated with some embodiments. In the discussion below, some flow diagrams are described with reference to block diagrams presented herein. However, in some embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform more or less than all the operations shown in any flow diagram.

Figure 3:
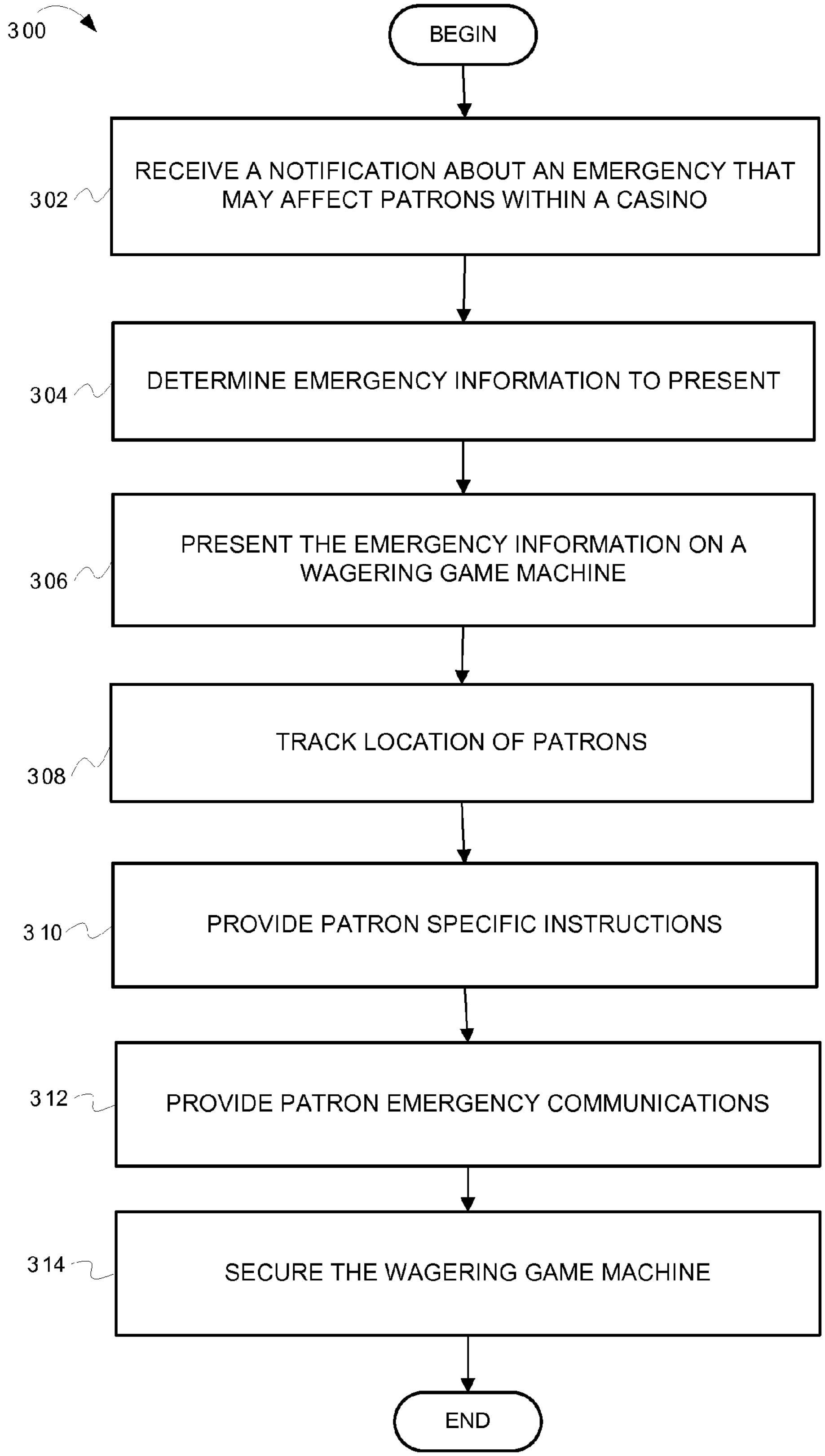
FIG. 3 is a flow diagram 300 illustrating determining and communicating in-casino emergency notifications, according to some embodiments.
Figure 4:
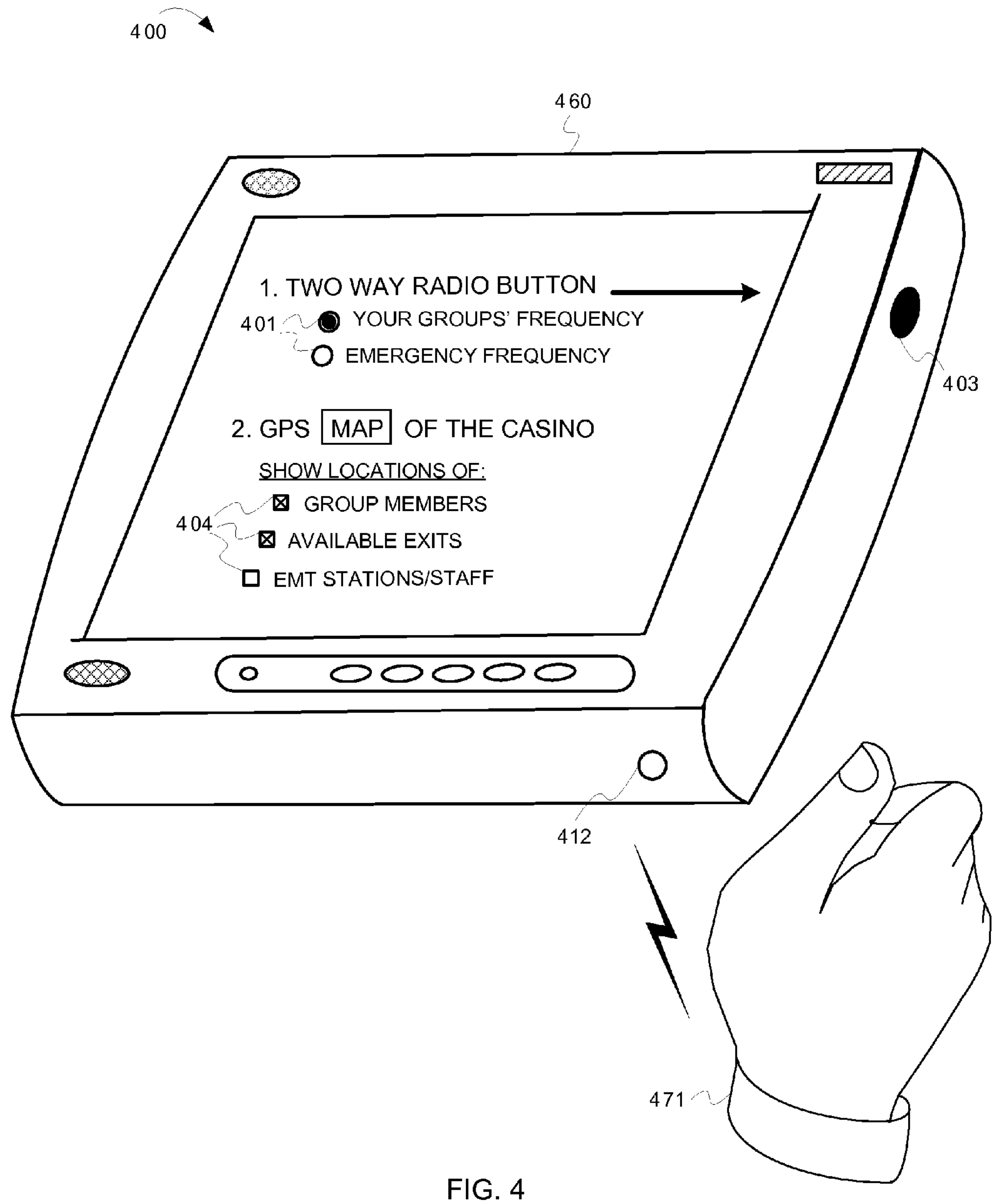
FIG. 4 is an illustration of determining casino patron identity and providing patron specific communication abilities and information, according to some embodiments.

FIG. 3 is a flow diagram ("flow") 300 illustrating determining and communicating in-casino emergency notifications, according to some embodiments. This description will present FIG. 3 in concert with some Figures, such as FIG. 1 and FIG. 4. In FIG. 3, the flow 300 begins at processing block 302, where a wagering game system ("system") receives a notification about an emergency that may affect patrons within a casino. In some embodiments, the system can link directly to various systems and/or departments of the casino (e.g., fire system, alarm systems, physical facility monitoring equipment, emergency services, security enforcement, emergency response groups, custodial services, engineering services, etc.) to obtain information that could pose an internal threat to the well-being (e.g., health, safety, etc.) of individuals within a casino. The system can also link directly to external emergency notification services (e.g., severe weather service, terrorist warning service, law enforcement services, amber alert, etc.) to obtain information that could pose an external threat to the well-being of individuals within a casino. In some embodiments, the system can receive player input that provides emergency notifications and/or enables the system to generate appropriate emergency content. For example, the wagering game machine may include a panic button, a locator button, an acknowledgement button, etc. that a player can activate. In some embodiments, the system can determine a group biometric (e.g., sound, movement, etc.) and determine disturbances in the group biometric. For example, the system can determine whether large amounts of people in an area have grown extremely agitated or uncharacteristically still, possibly evidencing a major catastrophic event or that the group is witnessing a distressing situation. In some embodiments, the system can detect voice recognition, potential injuries, facial expressions, erratic body movements, unnatural biometrics, unusual facial expressions, sounds of alarm or distress, or other indicators of unusual, and potentially emergency-related, incidences.

The flow 300 continues at processing block 304, where the system determines emergency information to present. In some embodiments, the emergency information can include information about anything affecting the well-being of the patron (e.g., lost persons, security, weather, fire, structural damage, chemicals, health risks, etc.). In some embodiments, the system can determine an emergency's scale, degree of importance, degree of severity, etc., and provide emergency information accordingly. For example, the system can determine a degree of intrusiveness of emergency information content ("emergency content") on a wagering game session based on the emergency's scale. The degree of intrusiveness can correlate to an amount of area, or space, used on a wagering game display (e.g., a high level emergency can take over all visible space on a wagering game display to make a notification whereas a lower level emergency can takes over less visible space, such as a notification in an auxiliary window on the wagering game display). In some embodiments the degree of intrusiveness can also determine the degree of repetitiveness of presenting the emergency content (e.g., a high level emergency can present information on a display in a repeating periodic pattern, or the candle on a wagering game machine can flash or spin faster, whereas a lower level emergency can present the information less frequently or the candle can flash or spin slowly). In yet other embodiments, the degree of intrusiveness can also determine the degree of effects, and/or volume of audio and visual information, used (e.g., a high level emergency can produce loud alarms, warnings, or instructions, bright or obvious colors to indicate instructions in large fonts, etc., whereas a lower level emergency can produce softer alarms, warnings or instructions, or more subdued, less vibrant, colors to indicate instructions in smaller fonts). In some embodiments, the system can use location tracking system (e.g., GPS, floor layout triangulation, repeater system, etc.) to determine emergency exit paths and generate maps showing the exit paths. The system can utilize player provided input and biometric readings to determine notifications. In some embodiments, the system can determine content for notifications, as well as preferences for the presentation of emergency notifications, from player accounts, personal online websites, etc. For example, a player account may include settings that describe a preference for audio communications versus graphical communications, notifications of spouse or other family member and/or friends locations on maps, indications and reminders of health related activities (e.g., a reminder to limit alcohol consumption to no more than 1 alcoholic drink per day, reminder to take medication every hour, indicators of emergency contact information, etc.).

The flow 300 continues at processing block 306, where the system presents the emergency information on a wagering game machine. In some embodiments, the system can present information to a degree of intrusiveness based on the importance of the emergency. For example, the system can present the emergency information on the wagering game display where wagering games are played. The system can take over as much of the wagering game display area that is necessary to present information, depending on the severity of the emergency and/or the size or importance of the emergency notification. The system can also present emergency information by degree of repetition that correlates to the importance of the emergency (e.g., present a flashing message that doesn't take up the entire game display, but may flash very frequently to indicate its importance). In some embodiments, as described in FIG. 1, the system can display exit paths (e.g., using arrows) on the display of wagering game machines. In some embodiments, the system can use non-display lighting (e.g., overhead lights, candle, special purpose light, etc.) from wagering game machines to present emergency alarms or signals. The system can also shift a wagering game machine to a backup power source in the case of an emergency so that the emergency notifications are not interrupted by lack of power. The system can present audio via hi-definition, digital stereo speakers, or other such high end sound equipment attached to the wagering game machine.

The flow 300 continues at processing block 308, where the system tracks the location of patrons. In some embodiments, the system can determine where patrons are within the casino, whether patrons have exited, their rate of movement, etc. The system can track specific people using radio frequency identification (RFID) cards or other devices. In some embodiments, an individual can carry a mobile wagering game machine around a casino floor, and also outside of the casino floor to other locations of the casino. Beyond the casino floor, the display on the wagering game machine can continue to function for purposes of presenting emergency notifications and location tracking, while wagering game functionality is disabled. The system can update information on the mobile wagering game machine's display based on an individual's movements and activities (e.g., it can show the player's location, show group members locations, can respond to requests by the individual, etc.). The system can also use other devices (e.g., bracelets, cell phones, etc.) to detect paths, groups, people, etc. For example, a player may wear a bracelet that when touched to a pad on a standing-model wagering game machine, the standing-model wagering game machine can display information about where to go, where group members are, etc. The system can use Blue-tooth technology, or other wireless communication technologies, online mapping programs, etc. to generate maps and to track locations of individuals on the maps. In some embodiments, the system can use a mesh network as a fail-safe system during times of emergencies. The wagering game machines may have logic that can shift to a mesh network communication mode.

The flow 300 continues at processing block 310, where the system provides patron specific instructions. As shown in FIG. 1, the system can provide specific escape routes for patron based on identity, preferences, assigned meeting places for a group, etc. The system can determine the location of associated individuals (e.g., associated patrons, family members, group members, friends, etc.) using tracking devices (e.g., the monitoring device 280 in FIG. 2). "Associated individuals" may include family members, friends, etc. For example, a family may register upon arriving at a casino and receiving tracking devices that indicate the identities of the family members. Each family member can wear a tracking device (e.g., a bracelet) or download a software program to their individual cell phones so that the system can uniquely identify their location within the casino's wireless network. The system can present a map on a display of the mobile wagering game machine and present the location of the patron and the associated individuals on the map. The system can determine a meeting location for the associated individuals. For example, the system can determine a meeting location based on an assigned meeting place set by the patron and/or associated individuals. The system can also automatically determine the location of the meeting location on such factors as (1) overall patron population in the casino (e.g., larger populations may require assigning multiple meeting locations at which patrons may congregate), (2) the distribution of the casino patron and the associated individuals (e.g., if a majority or plurality of the patrons in a group are closest to a specific meeting location then the system may determine that all group members meet at that meeting location), (3) physical abilities and/or age of patrons in a group (e.g., the system may select the meeting place so that handicapped, very young or very old patrons do not have to move long distances), (4) relationships between patrons (e.g., family members may all be assigned one location whereas other members of the group can be split up, if necessary, to other meeting locations), (5) detected health issues (e.g., the system may assign the meeting location based on the needs of someone who is hurt during the emergency), etc. As the patron and the associated individuals move within the casino's wireless network, the system can present on the map the positions of the patron and the associated individuals as they move to the meeting location. For example, in FIG. 4, a mobile wagering game machine 460 can provide a map button 406 that, when selected, shows a map of the casino. The mobile wagering game machine 460 can also include locator controls 404 that, when selected, can show specific items on the map that are of interest to the patron during an emergency, such as group/family members, available exits, meeting locations, emergency medical technician staff or stations, etc. Other types of patron specific instructions may relate to a player's own personal history or identity. For example, in some embodiments, the system can use the account information to determine the patron's medical or personal information related to a patron specific emergency. The system can use biometric monitors and sensors to determine whether the patron exhibits symptoms of an illness or health threatening accident. The system can present information that is specific to the patron, such as treatment for specific illness symptoms or accidents (e.g., first aid). The player can also set customizable settings based on what personal information they want to receive (e.g., receive health tips during wagering game play, set reminders to take medications, etc.).

The flow 300 continues at processing block 312, where the system provides patron emergency communications. In some embodiments, the system can receive and provide communication between patrons on mobile wagering game machines or other portable casino-provided devices. For example, in FIG. 4, the mobile wagering game machine 460 can provide two-way radio communications. A patron can select frequency controls 401 that determine a specific frequency (e.g., a frequency specific for a group, an emergency assistance frequency, etc.). The mobile wagering game machine 460 can include one or more buttons or controls that control the transmission of the communications (e.g., a talk button 430, a volume control, etc.). The mobile wagering game machine 460 can also include a wireless communication unit 412 that can detect information from a device possessed (e.g., worn, carried, etc.) by the casino patron, such as a radio frequency card, a radio frequency bracelet 471, a cell phone, etc.

The flow 300 continues at processing block 314, where the system secures the wagering game machine. During some emergencies, the system can lock down wagering game machines from providing wagering game functionality and provide only modes that communicate emergency notifications. The system can disable cash out on the wagering game machine, roll back the wagering game machine for wagering game sessions, copy critical data to data storage, etc. For instance, the system can prevent fraud, rogue activity, or other tampering with the wagering game machine, account information, or other sensitive data on the wagering game machine during an emergency. The system can enable a secure emergency mode on mobile wagering game machines so that they can be carried beyond the casino floor and function to provide only emergency communications until returned to the casino floor, reinitialized, manually reconfigured, etc.

Figure 5:
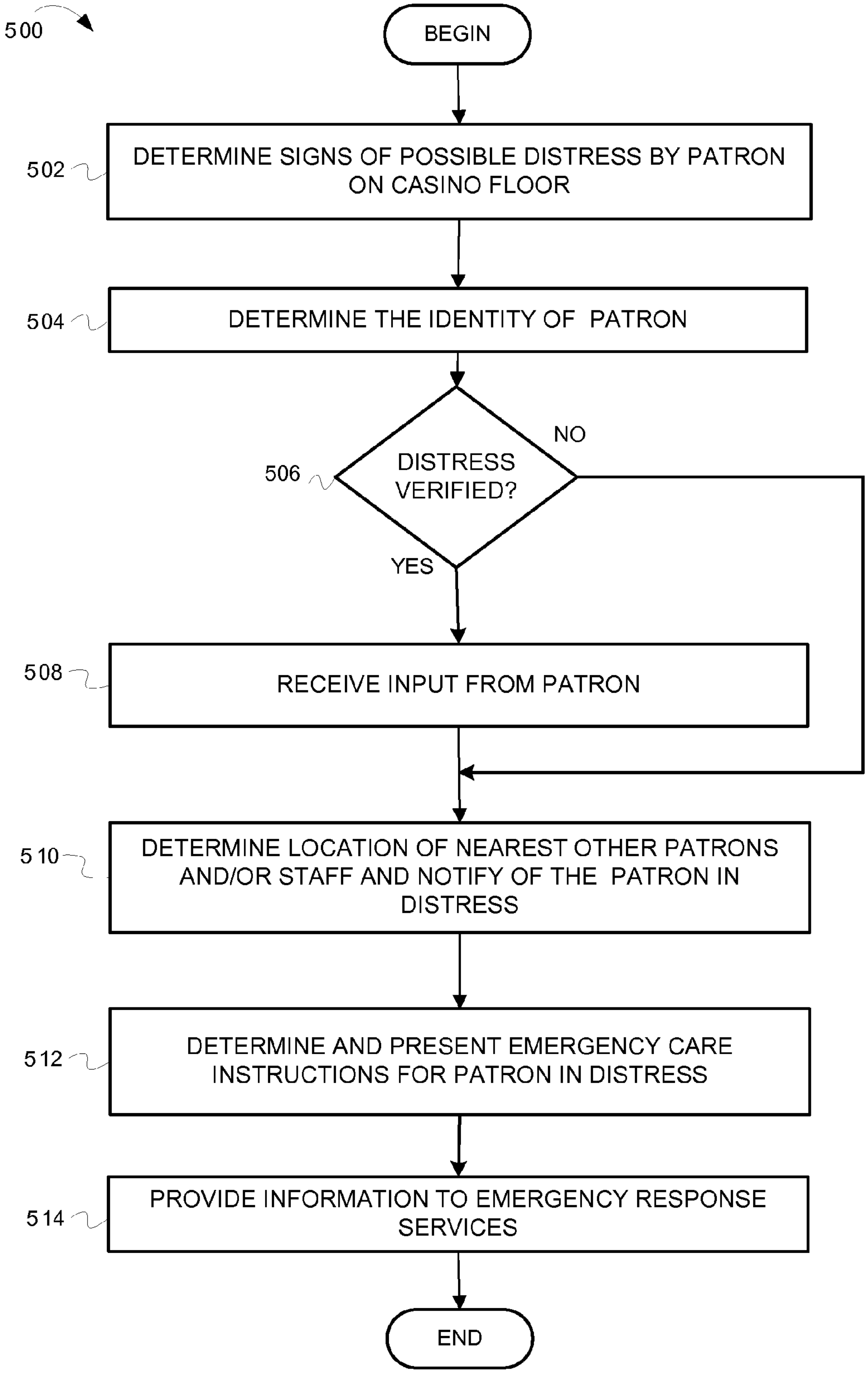
FIG. 5 is a flow diagram 500 illustrating determining and presenting patron specific emergency information, according to some embodiments.
Figure 6:
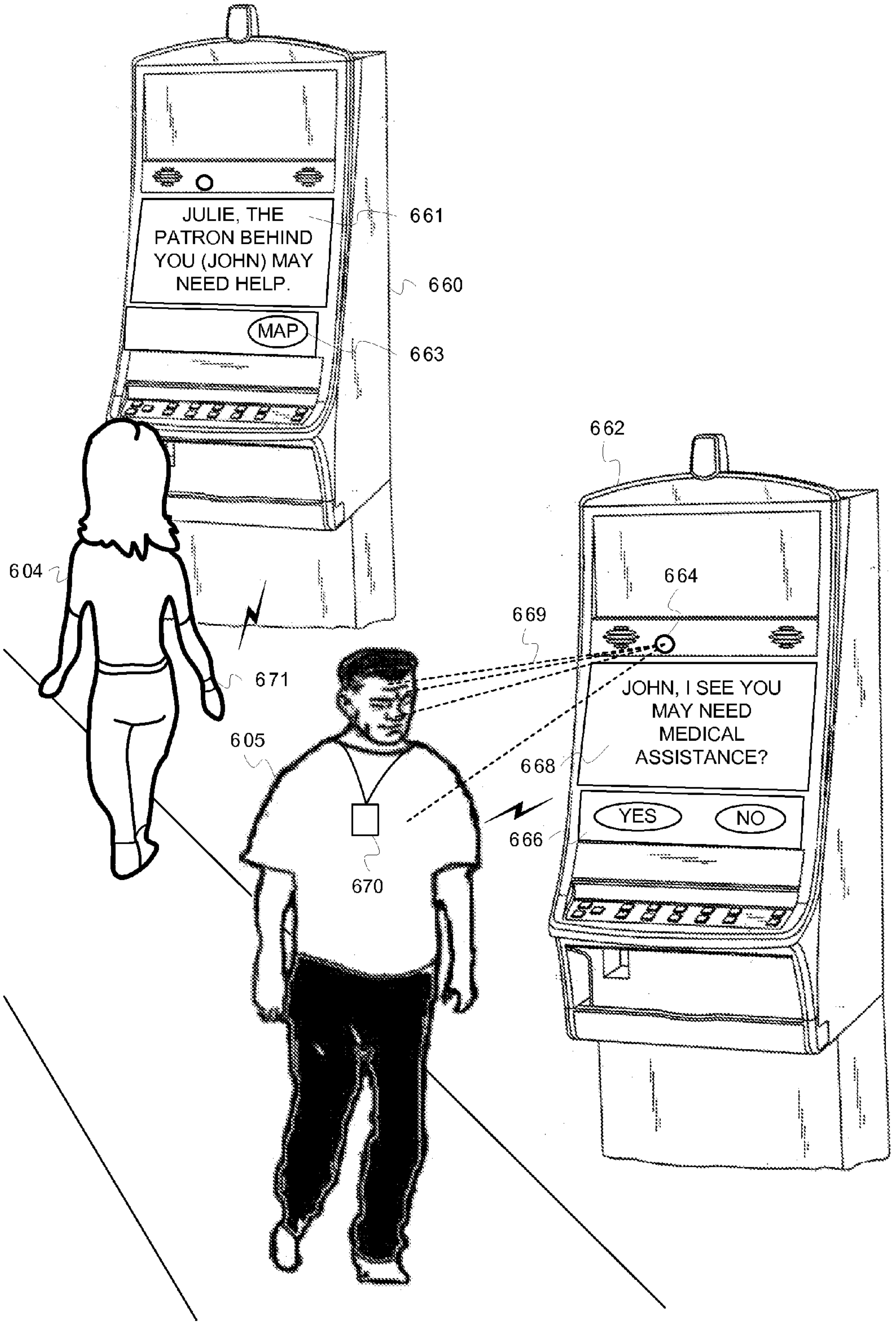
FIG. 6 is an illustration of determining casino patron distress and notifying others, according to some embodiments.
Figure 7:
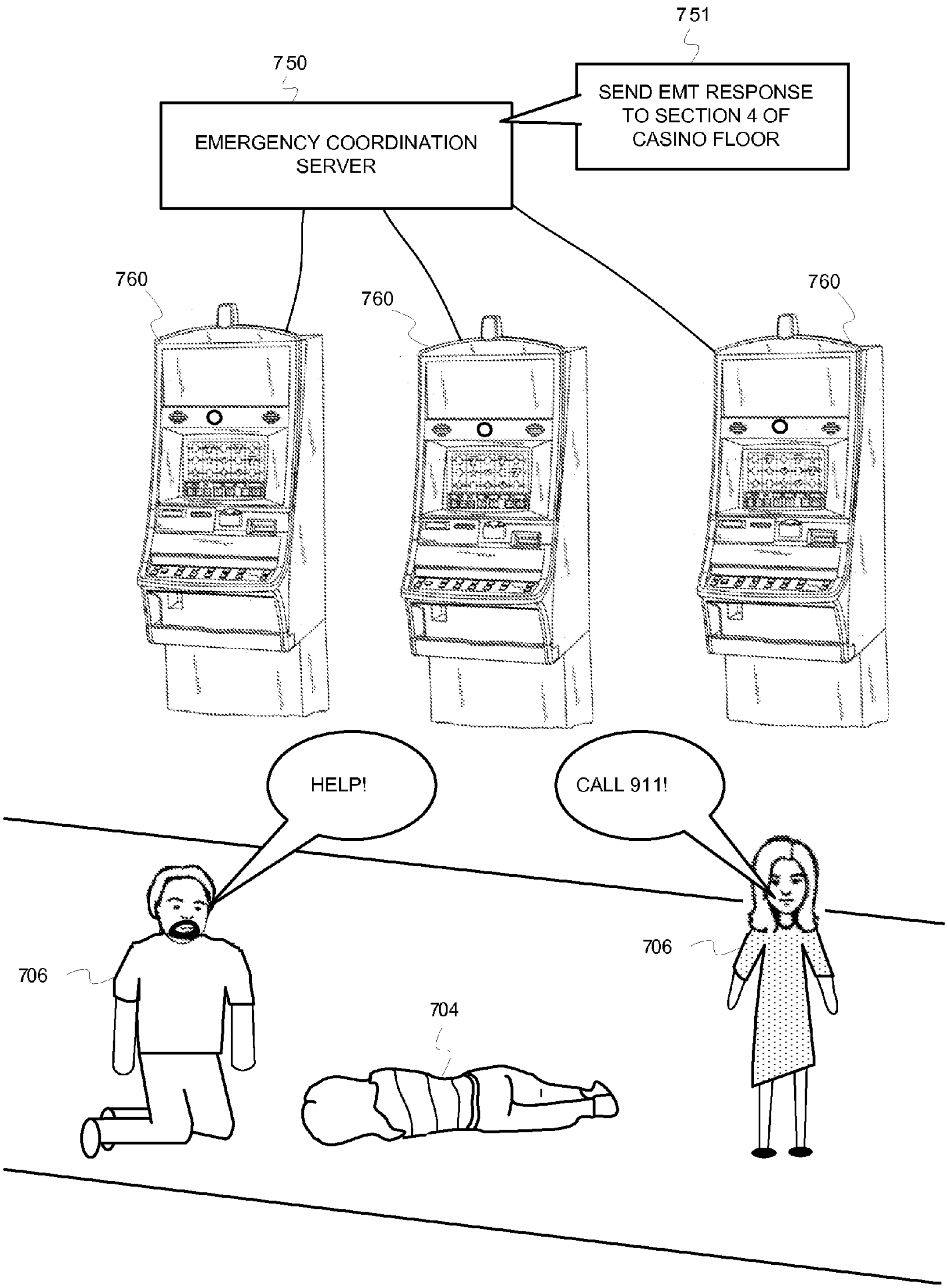
FIG. 7 is an illustration of determining group biometrics and notifying emergency services, according to some embodiments.

FIG. 5 is a flow diagram ("flow") 500 illustrating determining and presenting patron specific emergency information, according to some embodiments. FIGS. 6 and 7 are conceptual diagrams that helps illustrate the flow of FIG. 5, according to some embodiments. This description will present FIG. 5 in concert with FIGS. 6 and 7. In FIG. 5, the flow 500 begins at processing block 502, where a wagering game system ("system") determines signs of possible distress by a patron on a casino floor. The system can determine signs of distress using biometric scanning devices on a wagering game machine. FIG. 6 illustrates an example. In FIG. 6, a wagering game machine 662 includes a monitoring device 664 (e.g., a high-end video camera, a retinal scanner, a device that determine erratic body movements, a device that measures unnatural biometrics, a device that determines unusual facial expressions, a device that determines group agitation or stillness, a device that detects sounds of alarm or distress, etc.). The monitoring device 664 determines some behavior or characteristic of the patron 605 that indicates bodily distress (e.g., a pained look, closed eyes, trembling, bleeding, convulsions, groans, screams, etc.). For instance, the monitoring device 664 can send or receive signals 669 directed at, or generated by, various parts of the body. The signals 669 capture biometric data that indicates the distress.

The flow 500 continues at processing block 504, where the system determines the identity of the patron. In some embodiments, the system can determine the identity of the distressed patron by reading from a device associated with the patron. For example, in FIG. 6, the patron 605 wears an RFID player card ("player card") 670 that identifies the patron. The player card 670 can include identifying information (e.g., name, emergency contact information, insurance information, etc.) that the wagering game machine 662 can read wirelessly. The wagering game machine 662 can also read from the patron's player account that stores identifying information, as well as other information related to health and safety issues and/or preferences.

The flow 500 continues at processing block 506, where the system verifies whether the patron is in distress. In some embodiments, the system can prompt the patron, or others nearby, to verify that the patron is in distress. For example, in FIG. 6, the wagering game machine 662 presents a question on a display 668 asking the patron whether the patron is distressed. The wagering game machine 662 can also present a button panel 666 whereby the patron can respond to the question affirmatively or negatively. In some embodiments, the wagering game machine 662 can also have microphones so that the patron can respond by voice. In some embodiments, the patron can carry a device with buttons and controls that can respond to the question (e.g., the player card 670 can have buttons that indicates an affirmative or negative response to the question, which the wagering game machine 662 can detect wirelessly). The wagering game machine 662 can also set a timer and determine that if the patron doesn't respond within a specific time period the wagering game machine 662 can assume a response of either negative or positive based on body language exhibited by the patron (e.g., if the wagering game machine 662 determines that the patron stops moving, nods, or performs other activities that appear to answer the question in the affirmative or that the patron is too distressed to respond, the wagering game machine 662 assumes a positive response for help, whereas if the patron keeps walking away, wags his/her head, etc., the wagering game machine 662 can assume a negative response). If the patron can respond and verify the question, at processing block 508, the wagering game machine 662 can receive the input from the patron. In some embodiments, the patron can vocalize a problem into microphones on the wagering game machine 662. The wagering game machine 662 can then present follow-up questions so that the player can indicate specifics about the problem. The wagering game machine 662 can also present dropdowns or selection items showing possible medical options, emergency communication options, two-way communication options to friends or family members, mapping options with directions to nearby medical staff, etc.

The flow 500 continues at processing block 510, where the system determines the location of the nearest other patrons or staff and notifies them of the patron in distress. In some embodiments, the system can determine identities of nearest patrons/staff. For example, in FIG. 6, a wagering game machine 660 detects a nearby patron 606 via an identification bracelet 671 and presents a message on a display 661 that the nearby patron 605 is in distress or may need assistance. The wagering game machine 660 can also present a map or controls 663 that present a map showing the location of the patron in distress. Returning to FIG. 5, in some embodiments, the system can determine emergency care qualifications of the nearest patrons or staff and notify only those patron who are qualified to care for the type of distress exhibited by the distressed patron. In some embodiments, the system can also notify family members, via wagering game machines, other devices in the casino, via family members' cell phones, etc., that the patron is in distress and needs assistance.

The flow 500 continues at processing block 512, where the system determines and presents emergency care instructions for the distressed patron. The system can present the emergency care instructions on a wagering game machine, or other devices, that the patron is using and/or that the nearby individuals are close to or using. The health care instructions can relate to the distressed patron's relevant medical condition(s) and/or health history. In some embodiments, the system can notify the nearby patrons or staff of the distressed patron's medical conditions and other health needs that may relate to the apparent situation.

The flow 500 continues at processing block 514, where the system provides information to emergency response services. The system can contact the emergency response group for a casino. For example, in FIG. 7, wagering game machines 760 detect a disturbance on a casino floor where several patrons 706 are vocally indicating an accident, illness, or other incident which has affected an injured patron 704. The wagering game machines 760 are linked to an emergency coordination server 750 which sends a message 751 to an emergency medical response department.

Additional Example Operating Environments

This section describes example operating environments, systems and networks, and presents structural aspects of some embodiments.

Wagering Game Machine Architecture

Figure 8:
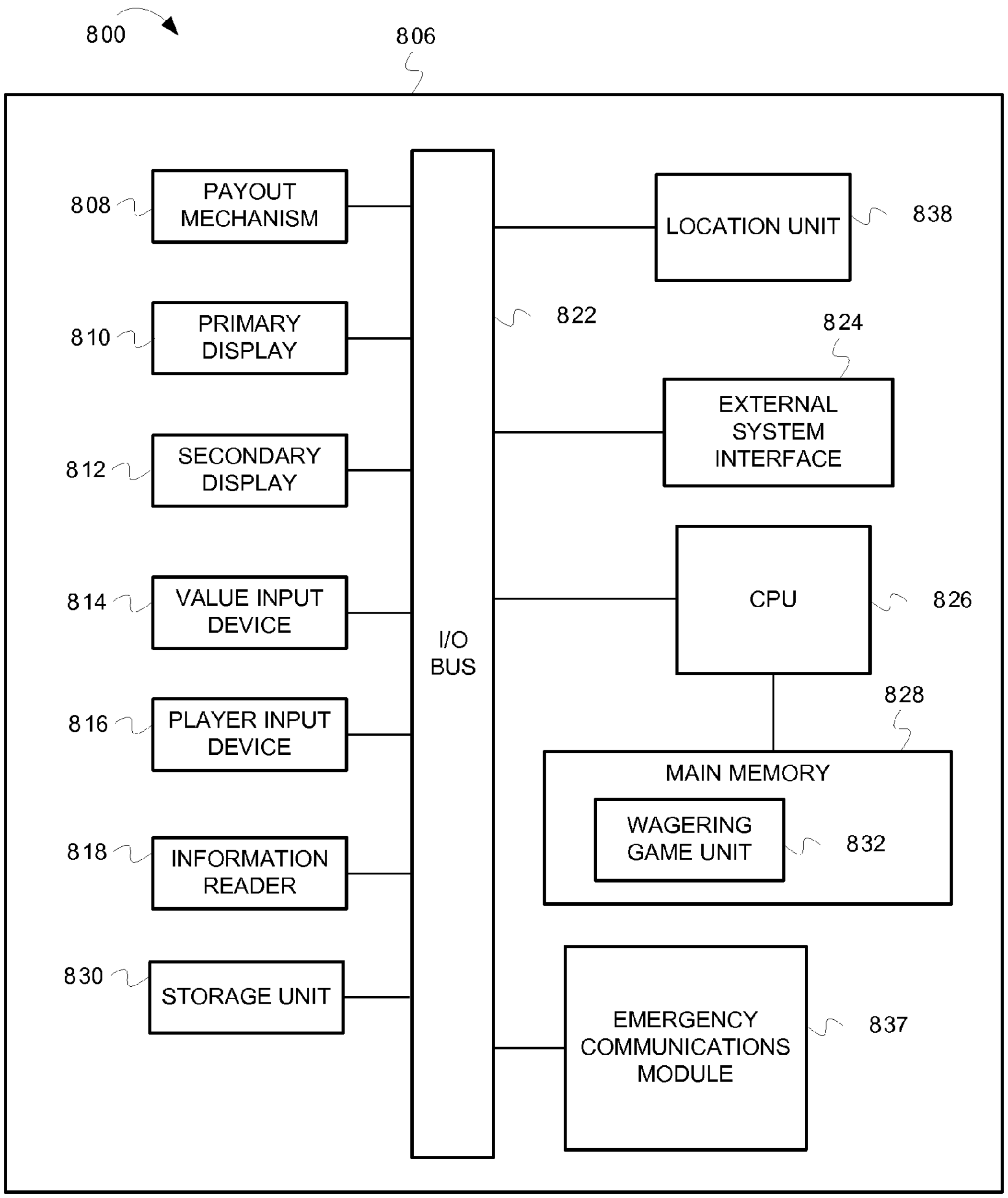
FIG. 8 is an illustration of a wagering game machine architecture 800, according to some embodiments.

FIG. 8 is a conceptual diagram that illustrates an example of a wagering game machine architecture 800, according to some embodiments. In FIG. 8, the wagering game machine architecture 800 includes a wagering game machine 806, which includes a central processing unit (CPU) 826 connected to main memory 828. The CPU 826 can include any suitable processor, such as an Intel® Pentium processor, Intel® Core 2 Duo processor, AMD Opteron™ processor, or UltraSPARC processor. The main memory 828 includes a wagering game unit 832. In some embodiments, the wagering game unit 832 can present wagering games, such as video poker, video black jack, video slots, video lottery, reel slots, etc., in whole or part.

The CPU 826 is also connected to an input/output ("I/O") bus 822, which can include any suitable bus technologies, such as an AGTL+ frontside bus and a PCI backside bus. The I/O bus 822 is connected to a payout mechanism 808, primary display 810, secondary display 812, value input device 814, player input device 816, information reader 818, and storage unit 830. The player input device 816 can include the value input device 814 to the extent the player input device 816 is used to place wagers. The I/O bus 822 is also connected to an external system interface 824, which is connected to external systems (e.g., wagering game networks). The external system interface 824 can include logic for exchanging information over wired and wireless networks (e.g., 802.11g transceiver, Bluetooth transceiver, Ethernet transceiver, etc.)

The I/O bus 822 is also connected to a location unit 838. The location unit 838 can create player information that indicates the wagering game machine's location/movements in a casino. In some embodiments, the location unit 838 includes a global positioning system (GPS) receiver that can determine the wagering game machine's location using GPS satellites. In other embodiments, the location unit 838 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 8, in some embodiments, the location unit 838 is not connected to the I/O bus 822.

In some embodiments, the wagering game machine 806 can include additional peripheral devices and/or more than one of each component shown in FIG. 8. For example, in some embodiments, the wagering game machine 806 can include multiple external system interfaces 824 and/or multiple CPUs 826. In some embodiments, any of the components can be integrated or subdivided.

In some embodiments, the wagering game machine 806 includes an emergency communications module 837. The emergency communications module 837 can process communications, commands, or other information, where the processing can communicate in-casino emergency notifications.

Furthermore, any component of the wagering game machine 806 can include hardware, firmware, and/or machine-readable media including instructions for performing the operations described herein.

Mobile Wagering Game Machine

Figure 9:
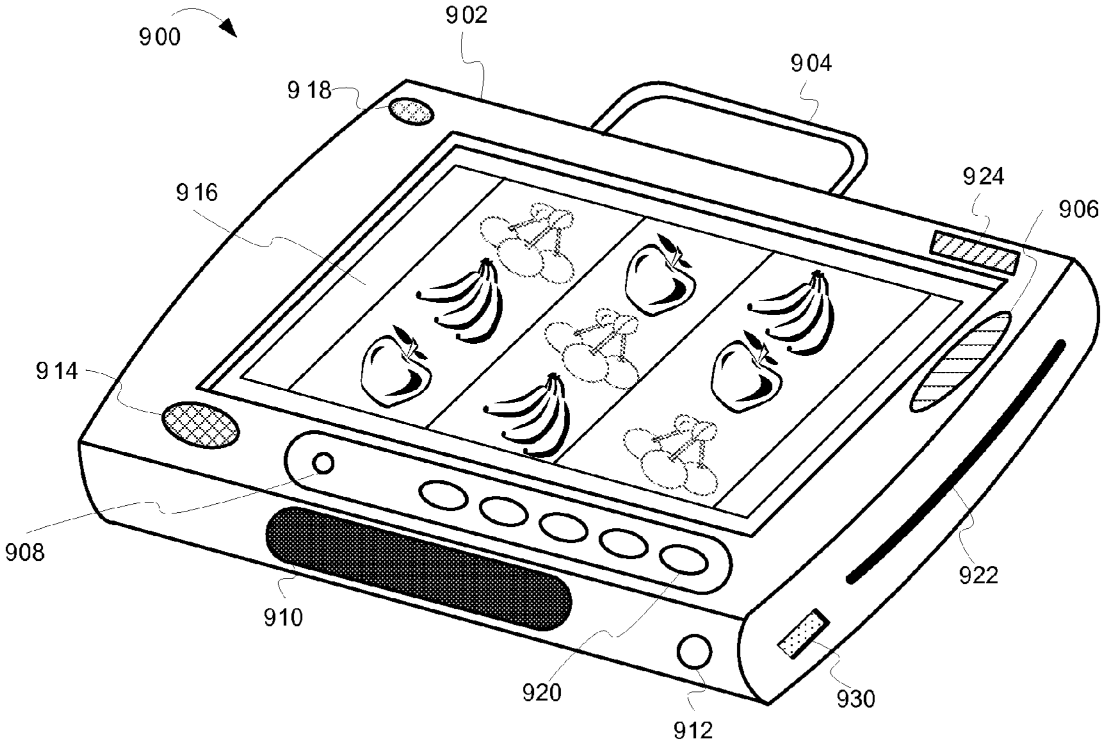
FIG. 9 is an illustration of a mobile wagering game machine 900, according to some embodiments.

FIG. 9 is a conceptual diagram that illustrates an example of a mobile wagering game machine 900, according to some embodiments. In FIG. 9, the mobile wagering game machine 900 includes a housing 902 for containing internal hardware and/or software such as that described above vis-à-vis FIG. 8. In some embodiments, the housing has a form factor similar to a tablet PC, while other embodiments have different form factors. For example, the mobile wagering game machine 900 can exhibit smaller form factors, similar to those associated with personal digital assistants. In some embodiments, a handle 904 is attached to the housing 902.

Additionally, the housing can store a foldout stand 910, which can hold the mobile wagering game machine 900 upright or semi-upright on a table or other flat surface.

The mobile wagering game machine 900 includes several input/output devices. In particular, the mobile wagering game machine 900 includes buttons 920, audio jack 908, speaker 914, display 916, biometric device 906, wireless transmission devices (e.g., wireless communication units 912 and 924), microphone 918, and card reader 922. Additionally, the mobile wagering game machine can include tilt, orientation, ambient light, or other environmental sensors.

In some embodiments, the mobile wagering game machine 900 uses the biometric device 906 for authenticating players, whereas it uses the display 916 and the speaker 914 for presenting wagering game results and other information (e.g., credits, progressive jackpots, etc.). The mobile wagering game machine 900 can also present audio through the audio jack 908 or through a wireless link such as Bluetooth.

In some embodiments, the wireless communication unit 912 can include infrared wireless communications technology for receiving wagering game content while docked in a wager gaming station. The wireless communication unit 924 can include an 802.11G transceiver for connecting to and exchanging information with wireless access points. The wireless communication unit 924 can include a Bluetooth transceiver for exchanging information with other Bluetooth enabled devices.

In some embodiments, the mobile wagering game machine 900 is constructed from damage resistant materials, such as polymer plastics. Portions of the mobile wagering game machine 900 can be constructed from non-porous plastics which exhibit antimicrobial qualities. Also, the mobile wagering game machine 900 can be liquid resistant for easy cleaning and sanitization.

In some embodiments, the mobile wagering game machine 900 can also include an input/output ("I/O") port 930 for connecting directly to another device, such as to a peripheral device, a secondary mobile machine, etc. Furthermore, any component of the mobile wagering game machine 900 can include hardware, firmware, and/or machine-readable media including instructions for performing the operations described herein.

The described embodiments may be provided as a computer program product, or software, that may include a machine-readable medium having stored thereon instructions, which may be used to program a computer system (or other electronic device(s)) to perform a process according to embodiments(s), whether presently described or not, because every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments, which are defined only by the appended claims. Each of the embodiments described herein are contemplated as falling within the inventive subject matter, which is set forth in the following claims.

The invention claimed is:

1. A computer-implemented method for monitoring casino safety, the computer-implemented method comprising:

determining, based on input from one or more casino emergency monitoring devices, emergency information that indicates a safety threat within a casino;

determining, based on the emergency information, emergency content for use in notifying one or more individuals about the safety threat, wherein the emergency content includes an emergency meeting location that is determined based, at least in part, on characteristics of a group including the one or more individuals; and presenting the emergency content on one or more wagering game machines within the casino.

2. The method of claim 1, wherein determining the emergency information that indicates a safety threat to one or more individuals within the casino comprises:

determining a biometric reading of the one or more individuals within the casino; and determining a disturbance in the biometric reading that indicates bodily distress.

3. The method of claim 2, wherein determining a biometric reading comprises monitoring the one or more individuals for one or more of physical symptoms of illness, indications of bodily injury, audible sounds of distress, dramatic change in pulse, dramatic change in blood pressure, change in body temperature, pained facial expressions, erratic body movements, belabored breathing, fainting, and vocal sounds of alarm.

4. The method of claim 1, wherein presenting the emergency content on the one or more wagering game machines comprises displaying a map on the one or more wagering game machines showing an exit path in relation to representations of one or more casino boundaries.

5. One or more non-transitory machine-readable media having instructions stored thereon, which when executed by a set of one or more processors causes the set of one or more processors to perform operations comprising:

determining one or more indications of distress of one or more distressed individuals in a casino;

determining identifying information for one or more distressed individuals that exhibit the one or more indications of distress;

determining emergency care instructions for the one or more distressed individuals;

determining a location of one or more nearby persons in the casino capable of assisting the one or more distressed individuals; and presenting notifications on casino devices that are close to the one or more nearby persons to notify the one or more nearby persons of the one or more distressed individuals.

6. The non-transitory machine-readable media of claim 5, wherein the notifications include one or more of the identifying information for the one or more distressed individuals, the one or more indications of distress, and the emergency care instructions.

7. The non-transitory machine-readable media of claim 5, said operations further comprising:

determining emergency care qualifications for the one or more nearby persons, wherein the emergency care qualifications indicate that the one or more nearby persons are capable of assisting the one or more distressed individuals; and notifying the one or more nearby persons based on their emergency care qualifications.

8. The non-transitory machine-readable media of claim 5, wherein said operation of presenting notifications on the casino devices that are close to the one or more nearby persons further comprises:

presenting a map on a wagering game machine display showing a location of the one or more distressed individuals in relation to the location of the one or more nearby persons.

9. The non-transitory machine-readable media of claim 5, wherein said operation of determining a location of the one or more nearby persons capable of assisting the one or more distressed individuals further comprises:

determining the location of one or more individuals associated with the one or more distressed individuals.

10. The non-transitory machine-readable media of claim 5, wherein said operation of determining the one or more indications of distress of the one or more distressed individuals comprises determining one or more of erratic body movements, unnatural biometrics, unusual facial expressions, group agitation, group stillness, sounds of alarm or distress, and behaviors of the individual that indicate bodily distress.

11. The non-transitory machine-readable media of claim 5, said operations further comprising:

determining input from the one or more distressed individuals regarding the one or more indications of distress; and determining the emergency care instructions for the one or more distressed individuals based on the input.

12. A system, comprising:

an emergency coordination server including, an emergency monitoring unit configured to determine emergency information that indicates an emergency situation in a casino, wherein the emergency situation affects one or more individuals within the casino, an identification unit configured to retrieve personal information about the one or more individuals within the casino, and a monitoring processor configured to determine emergency instructions to present to the one or more individuals to notify the one or more individuals of the emergency situation, wherein the emergency instructions relate to the emergency information and the personal information, wherein the emergency instructions include an emergency meeting location determined in accordance with characteristics of a group including the one or more individuals; and a wagering game machine comprising;

an emergency content controller configured to present the emergency instructions on one or more devices associated with the one or more individuals.

13. The system of claim 12, wherein the wagering game machine further comprises:

a location tracking unit configured to determine a location of the one or more individuals within the casino, and present a map indicating the location of the one or more individuals and the emergency instructions.

14. The system of claim 13, wherein the emergency coordination server further comprises, a mapping module configured to generate the map indicating the location of the one or more individuals, and provide the map to the wagering game machine.

15. The system of claim 12, wherein the wagering game machine further comprises:

a biometric device controller configured to determine biometric data indicating distress experienced by the one or more individuals during the emergency situation, and provide the biometric data to the monitoring processor to determine the emergency instructions.

16. The system of claim 12, wherein the wagering game machine further comprises a communication unit configured to provide two-way communications between the one or more individuals within the casino.

17. The system of claim 12, wherein the emergency monitoring unit is configured to determine information from one or more of a fire system, an alarm system, physical facility monitoring equipment, an emergency services system, a security enforcement system, emergency response system, a custodial services system, an engineering services system, a weather services system, a terrorist warning services system, a law enforcement services system, and an amber alert services system.

18. An apparatus, comprising:

a monitoring unit configured to determine an emergency notification for a casino, determine an identity of a casino patron using a mobile wagering game machine, present a map on a display of the mobile wagering game machine, wherein the map displays representations of one or more casino boundaries, present a location of the casino patron on a map in relation to the one or more representations of the one or more casino boundaries on the map, present the location of one or more additional patrons on the map in relation to one or more of the location of the one or more representations of the one or more casino boundaries and the location of the casino patron, and present an emergency meeting location for the casino patron and the one or more additional patrons, wherein the emergency meeting location is determined in accordance with characteristics of a group including the one or more additional patrons.

19. The apparatus of claim 18, wherein the monitoring unit is further configured to determine movement of one or more tracking devices associated with one or more of the mobile wagering game machine, the casino patron, and the one or more additional patrons, and present the movement on the map.

20. The method of claim 18, wherein the monitoring unit is further configured to present an escape route on the map for the one or more individuals based on one or more of individual identity, individual preferences, assigned meeting places for a group, individual medical history, account information, and individual biometric data.

21. The apparatus of claim 18, wherein the monitoring unit is configured to determine the emergency meeting location for the associated individuals by determining one or more of overall patron population in the casino, distribution of associated group members, physical abilities of patrons, age of patrons, relationships between patrons, and detected health issues of patrons.

22. An apparatus, comprising:

means for determining emergency information that indicates one or more of a potential harm and a safety hazard to one or more individuals on a casino floor;

means for determining a degree of severity for the emergency information;

means for determining, based on the degree of severity, emergency content to present to the one or more individuals during a wagering game session;

means for determining a degree of presentation intrusiveness that correlates to the degree of severity for the emergency information; and means for determining an emergency meeting location, wherein the emergency meeting location is determined in accordance characteristics of a group including the one or more individuals;

means for presenting the emergency content and the emergency meeting location, according to the degree of presentation intrusiveness, on a wagering game machine that hosts the wagering game session.

23. The apparatus of claim 22, wherein the means for determining a degree of presentation intrusiveness comprises means for determining that the degree of presentation intrusiveness correlates to one or more of an amount of a wagering game display to occupy with the emergency content, a degree of repetitiveness for presenting the emergency content, and level of audio volume for presenting the emergency content, and a degree of visual effect for presenting the emergency content.

24. The apparatus of claim 22, wherein the means for determining the emergency information comprises means for determining biometric data of the one or more individuals that indicate possible signs of bodily distress experienced by the one or more individuals.

* * * * *